(12) United States Patent
Wakabayashi et al.

(10) Patent No.: US 7,316,375 B2
(45) Date of Patent: Jan. 8, 2008

(54) BAND CLAMP

(75) Inventors: Yasuki Wakabayashi, Kanagawa (JP); Kazuyoshi Shiga, Kanagawa (JP)

(73) Assignees: Piolax, Inc., Yokohama-Shi, Kanagawa-Ken (JP); Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 11/185,959

(22) Filed: Jul. 21, 2005

(65) Prior Publication Data
US 2006/0016938 A1 Jan. 26, 2006

(30) Foreign Application Priority Data
Jul. 21, 2004 (JP) .......................... P. 2004-213610

(51) Int. Cl.
*F16B 45/00* (2006.01)
(52) U.S. Cl. .................. 248/71; 24/16 PB; 248/74.3
(58) Field of Classification Search .............. 248/71, 248/74.1, 74.2, 74.3; 24/16 PB, 17 AP
See application file for complete search history.

(56) References Cited

U.S. PATENT DOCUMENTS

| | | | |
|---|---|---|---|
| 4,728,064 A | 3/1988 | Caveney | |
| 4,875,647 A * | 10/1989 | Takagi et al. | 248/74.3 |
| 6,149,109 A * | 11/2000 | Stankowski | 248/74.3 |
| 6,749,157 B2 * | 6/2004 | Takeuchi | 248/71 |
| 2003/0075647 A1 | 4/2003 | Takenaga | |

FOREIGN PATENT DOCUMENTS

| | | |
|---|---|---|
| DE | 35 44938 A1 | 6/1987 |
| EP | 0 677 688 A2 | 10/1995 |
| GB | 1 436 233 | 3/1976 |
| JP | 08-7129 | 4/1996 |
| JP | 2001-357910 A | 12/2001 |

OTHER PUBLICATIONS

European Search Report dated Nov. 25, 2005.

* cited by examiner

*Primary Examiner*—Ramon O Ramirez
(74) *Attorney, Agent, or Firm*—McGinn IP Law Group, PLLC (57) ABSTRACT

A band clamp including: a band portion which is wound around a member to be bundled; a lock portion to which a base end of the band portion is connected; engaging projections which are formed in the band portion along a direction of length of the band portion at predetermined intervals; an insertion path through which an end of the band portion is passed; a lock claw that is disposed in the insertion path and that engages with the engaging projection of the band portion; and ribs extending along both sides of the band portion from a connection part of the band portion in a direction in which the band portion extends, wherein: the lock portion has the insertion path and the lock claw; and the ribs are formed on a clamp face of the lock portion, against which the member to be bundled abuts.

15 Claims, 9 Drawing Sheets

Related Art

FIG. 9

Related Art

BAND CLAMP

BACKGROUND OF THE INVENTION

1. Field of the Invention

The present invention relates to a band clamp for clamping a member to be bundled, for example, a wire harness.

2. Description of the Related Art

Wire harnesses to be wired in an automobile and an electrical apparatus are bundled by band clamps and fixed to a automobile body panel and a frame.

Figure 8:
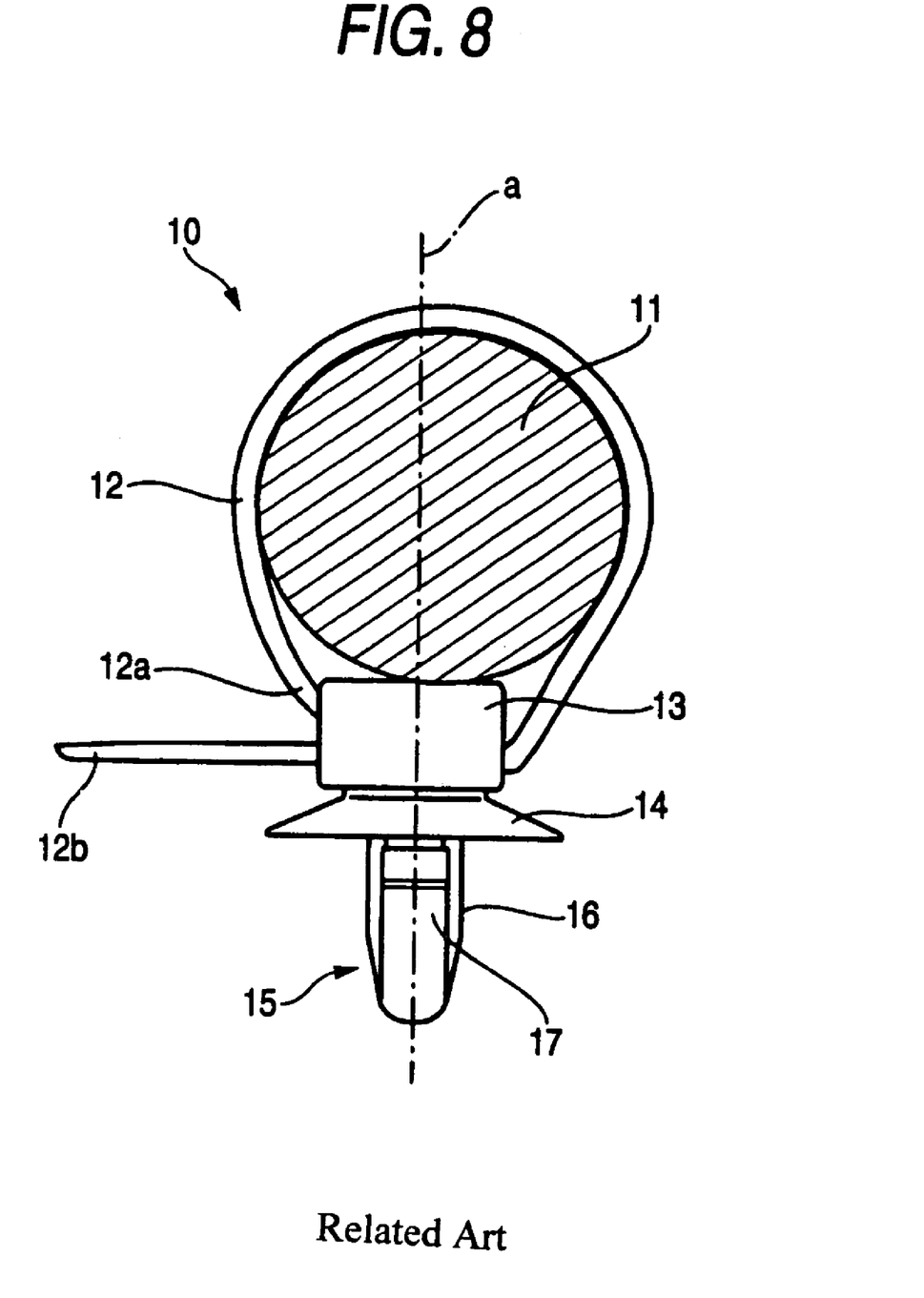
FIG. 8 is a front view illustrating an example of a state in which a member to be bundled is clamped by a conventional band clamp.
Figure 9:
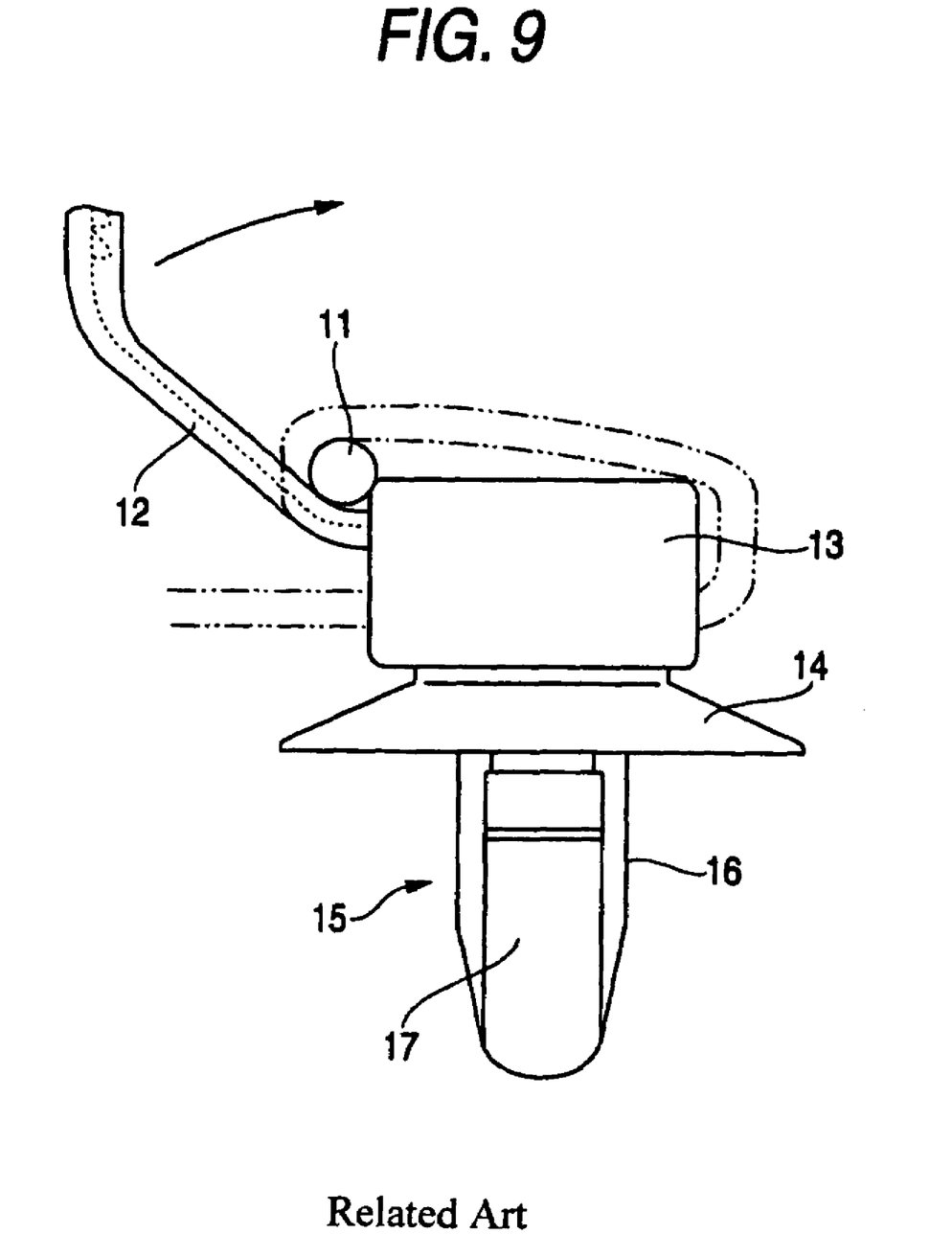
FIG. 9 is a partial front view illustrating another example of the state in which the member to be bundled is clamped by the conventional band clamp.

For example, as shown in FIGS. 8 and 9, such a band clamp 10 has a band portion 12, which is wound around a member 11 to be bundled, such as a wire harness, and a lock portion 13 to which a base part 12a of this band portion 12 is connected. Engaging projections (not shown) are formed on one side of the band portion 12 along the direction of length thereof at predetermined intervals. The lock portion 13 has an insertion path (not shown), into which an end 12b of the band portion 12 is inserted, and a lock claw that is disposed in this insertion path and that engages with the engaging projection of the band portion 12.

Further, the lock portion 13 has a flange part 14, which obliquely downwardly flares in the direction of an outside diameter thereof, and a catching leg part 15 hanging downwardly from the center of the bottom surface thereof. The catching leg part 15 has a support column 16 and a pair of elastic catching pieces 17 upwardly extending from the bottom of this support column 16 like an anchor (only one of these pieces is shown in each of these figures).

Furthermore, the band portion 12 is wound around a predetermined part of the member 11 to be bundled. The end 12b of the band portion 12 is passed through and pulled out of the insertion path. Then, the member 11 is fastened with the band portion 12. Thus, in this state, the engaging projection of the band portion 12 engages with the lock claw provided in the insertion path to thereby prevent the member 11 from slipping off. Consequently, the member 11 to be bundled can be clamped. During this state, the catching leg part 15 is inserted into and caught in a mounting hole of an automobile body panel or a frame. Thus, the member 11 to be bundled can be fixed thereto.

Further, the following JP-UM-B-8-7129 discloses a belt clamp having a belt portion, which is enabled to be wound around the outer periphery of an object to be bundled, and a buckle portion, which is connected to a base end part of this belt portion and enabled to clamp the object by passing the belt portion therethrough from the end part thereof and then winding up the belt portion. This belt clamp features that a connection position, at which the belt portion is connected to the buckle portion, is set at a position to which the clamp face of the belt portion at the side brought into contact with the outer periphery of the object during the clamping thereof is deviated in the outward direction of the object from the clamp face of the buckle portion at the same side, and that whirl-stop projections are formed on the clamp face of the buckle at places opposed in the circumferential direction of the object, respectively.

However, as shown in FIG. 8, the conventional band clamp has a tendency that a member 11, which is to be bundled, is deviated with respect to the shaft center axis a of the catching leg portion 15 by being pushed in a direction, in which the band portion 12 is pulled, when the band portion 12 is wound around the member 11 to be bundled, and the end 12b of the band portion 12 is passed through the insertion path of the lock portion 13 and pulled out therefrom. Thus, when a worker has this member 11 in his hand and inserts the catching leg part 15 into the mounting hole of the automobile body panel or the frame, the catching leg part 15 may be inserted obliquely into the mounting hole, because the worker supposes that the shaft center of the catching leg part 15 is placed in the center of the member 11. Consequently, sometimes, the catching leg part 15 is damaged or not surely fixed.

Further, as shown in FIG. 9, in a case where the member 11 to be bundled is thin, the member 11 is sometimes sandwiched between the base part of the band portion 12 and a side wall of the lock portion 13. Thus, the member 11 may be clamped at a position at which the member 11 is largely eccentric with respect to the catching leg part 15. In such a case, when the member 11 to be bundled is to be fixed to the automobile body panel or the frame, it is not disposed on a predetermined path. Thus, there has been the possibility that the member 11 may interfere with surrounding members.

Meanwhile, in the belt clamp disclosed in JP-UM-B-8-7129, the whirl-stop projections are formed at opposed places arranged in the circumferential direction of the member, which is to be bundled, on the clamp surface of the buckle. However, in the case that the member to be bundled is thin, this belt clamp cannot avoid the problem that this member is sandwiched between the base part of the belt portion and the side wall of the buckle. Thus, there has been the possibility that the aforementioned problems may more easily be caused by the projections provided on both sides of the clamp face.

SUMMARY OF THE INVENTION

An object of the invention is to provide a band clamp enabled to clamp a member, which is to be bundled, without eccentricity by disposing the member, which is to be bundled, nearly at the central part of the clamp face of the lock member.

To achieve the foregoing object, according to an aspect of the invention, there is provided a band clamp (hereunder referred to as a first band clamp) having a band portion, which is wound around a member to be bundled, and a lock portion, to which a base end of the band portion is connected. Engaging projections are formed in the band portion along a direction of length of the band portion at predetermined intervals. The lock portion has an insertion path, through which an end of the band portion is passed, and a lock claw that is disposed in the insertion path and that engages with the engaging projection of the band portion. The first band clamp features that ribs respectively extending along both sides of the band portion from a connection part of the band portion in a direction, in which the band portion extends, are formed on a clamp face of the lock portion, against which the member to be bundled abuts.

According to the first band clamp of the invention, when the member to be bundled is made to abut against the clam face, and the band portion is wound around the member to be bundled, and an end part of the band portion is inserted into the insertion path and then pulled, the base part of the band portion rises from between the ribs. Thus, the member to be bundled is inevitably put on the ribs and fastened by the band portion without being put into a space between the base part of the band portion and the side wall of the lock portion. Therefore, the member to be bundled can be prevented from being sandwiched between the base part of the band portion and the side wall of the lock portion and from being clamped at an eccentric position.

According to another aspect of the invention, there is provided a band clamp (hereunder referred to as a second band clamp) having a band portion, which is wound around a member to be bundled, and a lock portion, to which a base end of the band portion is connected. Engaging projections are formed in the band portion along a direction of length of the band portion at predetermined intervals. The lock portion has an insertion path, through which an end of the band portion is passed, and a lock claw that is disposed in the insertion path and that engages with the engaging projection of the band portion. The second band clamp features that tapered ribs, the height of each of which increases toward an inlet portion of the insertion path, are formed on a clamp face of the lock portion, against which the member to be bundled abuts.

According to the second band clamp of the invention, in a case where the member to be bundled is made to abut against the clam face, and where the band portion is wound around the member to be bundled, and where an end part of the band portion is inserted into the insertion path and then pulled, even when the member to be bundled is pressed in a direction in which the member to be bundled is pulled, the member to be bundled is pressure-contacted with the tapered ribs, which are provided on the clamp face, and restrained from being moved. Consequently, the member to be bundled can be prevented from being clamped at a position that is eccentric from the center of the clamp face.

According to still another aspect of the invention, there is provided a band clamp (hereunder referred to as a third band clamp) having a band portion, which is wound around a member to be bundled, and a lock portion, to which a base end of the band portion is connected. Engaging projections are formed in the band portion along a direction of length of the band portion at predetermined intervals. The lock portion has an insertion path, through which an end of the band portion is passed, and a lock claw that is disposed in the insertion path and that engages with the engaging projection of the band portion. The third band clamp features that ribs respectively extending along both sides of the band portion from a connection part of the band portion in a direction, in which the band portion extends, and tapered ribs, the height of each of which increases toward an inlet portion of the insertion path, are formed on a clamp face of the lock portion, against which the member to be bundled abuts.

According to the third band clamp of the invention, the member to be bundled can be prevented form being put between the base part of the band portion and the side wall of the lock portion and from being clamped at an eccentric position. Also, the member to be bundled is restrained from moving in a direction in which the band portion is pulled. Thus, the member to be bundled can be prevented from being clamped at a position that is eccentric from the center of the clamp face.

The invention provides an embodiment (hereunder referred to as a fourth band clamp) of the first or third band clamp. In the fourth band clamp, a catching leg part to be caught in a rear surface side of the mounting hole through a flange portion engaging with a peripheral edge of the mounting hole for mounting the member to be bundled is formed in the lock portion. A drawing guide portion extending in a direction, in which the band portion is drawn, is provided at an outlet portion of the insertion path. An end of the drawing guide portion is outwardly extended from the flange portion.

According to the fourth band clamp of the invention, when an excess length part drawn out of the insertion path of the band portion is cut off by a cutter or the like, because the drawing guide portion is outwardly extended from the flange portion, the band portion is cut off at the end of the drawing guide portion. Thus, the flange portion can be prevented from being erroneously cut off.

The invention provides an embodiment (hereunder referred to as a fifth band clamp) of one of the second to fourth band clamps. In the fifth band clamp, a rising part of each of the tapered ribs is provided nearly at a central part of the clamp face.

According to the fifth band clamp of the invention, when the member to be bundled is restrained by the tapered ribs from moving, the member to be bundled is stably positioned at which the center thereof is positioned at the rising part of the tapered rib, because the rising portions of the tapered ribs are provided nearly at the central part of the clamp face. Thus, even when the outside diameter of the member to be bundled changes, the member to be bundled can be clamped so that the center of thereof is always positioned at the center of the clamp face.

The invention provides an embodiment (hereunder referred to as a sixth band clamp) of one of the second to fifth band clamps. In the sixth band clamp, the tapered ribs are formed in such a way as to project from an inlet portion of the insertion path.

According to the sixth band clamp of the invention, even when the outside diameter of the member to be bundled is large, the member can effectively restrained from moving when pulled by the band portion. The member to be bundled can stably be held nearly at the central part of the clamp face.

The invention provides an embodiment (hereunder referred to as a seventh band clamp) of one of the second to sixth band clamps. In the seventh band clamp, the engaging projections are formed on an inner side of the band portion. Ribs are formed on both sides of the band portion. The lock claw is provided on an upper wall in the insertion path.

According to the seventh band clamp, the provision of the lock claw on the upper wall in the insertion path eliminates the necessity for ensuring a space, which allows the lock claw to bend in the rear of the lock claw. Thus, the thickness of the lock portion can be reduced. In a case where the catching leg part is provided in the lock portion, a clamping position can be set further closer to the mounting face. Furthermore, the ribs provided on both sides of the lock portion bite into the member to be bundled. Thus, the member to be bundled can be deviated in the longitudinal direction.

The invention provides an embodiment (hereunder referred to as an eighth band clamp) of one of the second to seventh band clamps. In the eighth band clamp, the lock claw is provided in a part that is placed short of an outlet portion of the insertion path.

The eighth band clamp can eliminate the fear that when an excess length part of the band portion, which is drawn out of the insertion path is cut off, a part, with which the lock claw engages, may be cut off.

According to the invention, the member to be bundled can be prevented from being clamped at an eccentric position by being sandwiched between the base portion of the band portion and the side wall of the lock portion. Alternatively, the member to be bundled is restrained from being moved in the direction, in which the band portion is pulled. Thus, the member to be bundled can be prevented from being clamped at a position that is eccentric from the center of the clamp face. Consequently, the member to be bundled can be clamped without eccentricity by disposing the member, which is to be bundled, nearly at the center of the clamp face of the lock member.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

FIGS. 1 to 7 show an embodiment of a band clamp according to the invention. Incidentally, components, which are substantially the same as those of the conventional band clamp shown in FIGS. 8 and 9, are designated by the same reference characters used for denoting those of the conventional band clamp.

Figure 1:
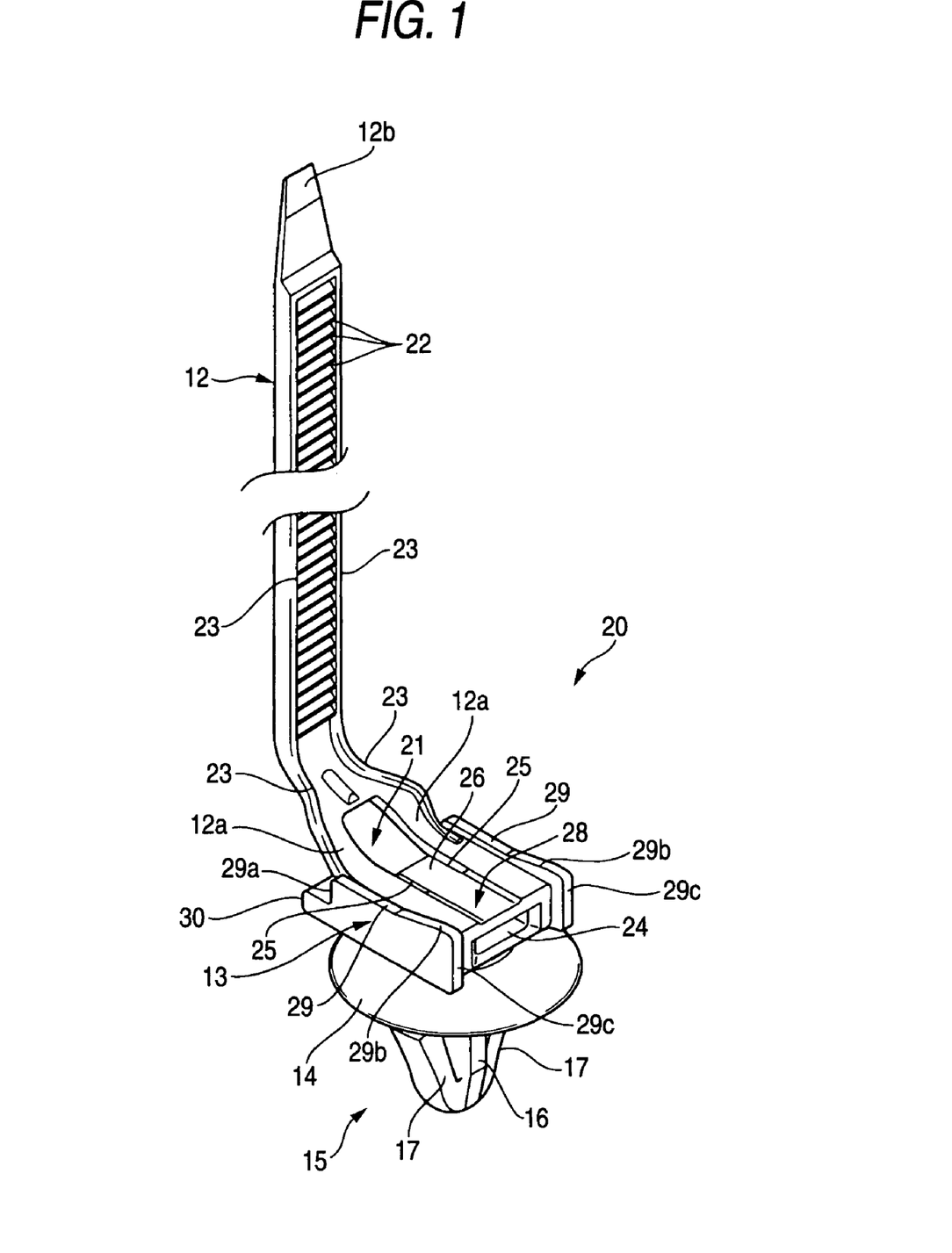
FIG. 1 is a perspective view illustrating an embodiment of a band clamp according to the invention.
Figure 2:
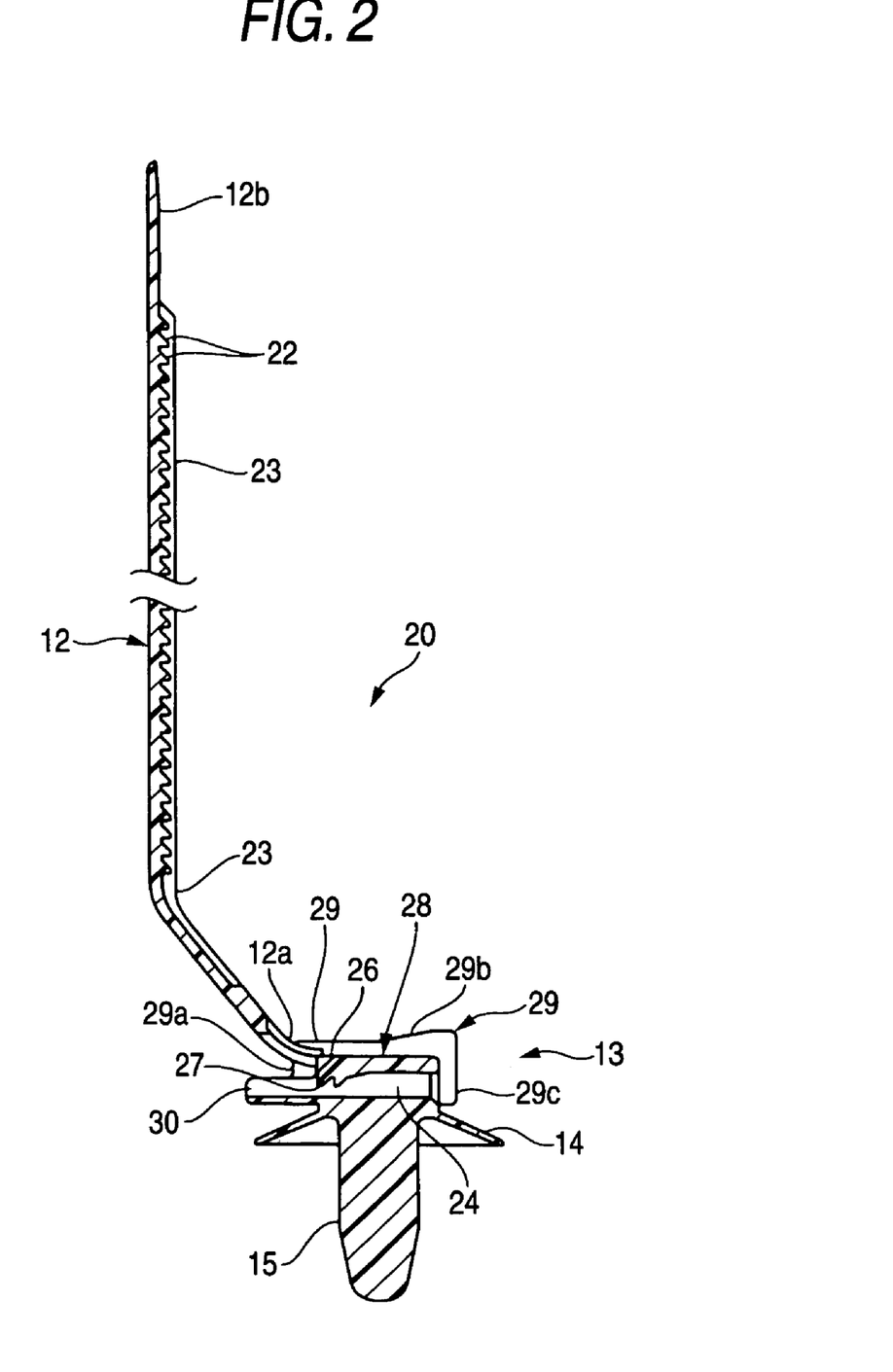
FIG. 2 is a longitudinal cross-sectional view illustrating the band clamp.

As shown in FIGS. 1 and 2, this band clamp 20 has a band portion 12, which is wound around a member to be bundled 11, such as a wire harness (see FIGS. 3 to 5), and a lock portion 13, to which abase part 12a of this band portion 12 is connected. Incidentally, according to the invention, the member to be bundled 11 may be a single wire harness, in addition to plural wire harnesses.

The base part 12a of the band portion 12 is divided into two parts provided on both sides thereof by a through hole 21 provided in a central part thereof, and connected to the lock portion 13. Plural engaging projections 22 are formed on the inner surface of the band portion 12 at predetermined intervals along the direction of length thereof. Further, ribs 23 projecting toward the inner surface of the band portion 12 are formed on both sides thereof along the direction of length thereof. An end 12b of the band portion 12 is narrowed in such a way as to be tapered, so that the thickness thereof is reduced.

A clamp face 28, which abuts against the member 11 to be bundled, and an insertion path 24, through which the end 12b of the band portion 12 is passed, are formed in the lock portion 13. An elastic piece 26, to which elasticity is imparted by a pair of slits 25, is provided at an outlet-side upper wall of this insertion path 24. A lock claw 27, which engages with the engaging projection 22 of the band portion 12 to thereby prevent the slip-off of the band portion 12, is formed on the inner surface of this elastic piece 26.

Furthermore, ribs 29 are formed on both sides of the clamp face 28. A rear end part 29a of each of the ribs 29, which is placed in the vicinity of an outlet portion of the insertion path 24, extends to a side, from which the band portion 12 extends, beyond the connection part to the base part 12a of the band portion 12. Further, a tapered part 29b is provided on the top surface of each of the ribs 29 in such a way as to be erected from a central part of the clamp face 28 and as to have a height gradually increasing toward the inlet portion of the insertion path 24. Furthermore, a front end part 29c of each of the ribs 29, which is placed in the vicinity of the inlet portion of the insertion path 24, extends outwardly from the inlet portion of the insertion path 24.

Further, a drawing guide portion 30 extending in a direction, in which the band portion 12 is drawn, is provided at the outlet portion of the insertion path 24 of the lock portion 13. An end of this drawing guide portion 30 is outwardly extended from a flange portion 14 (to be described later).

Figure 4:
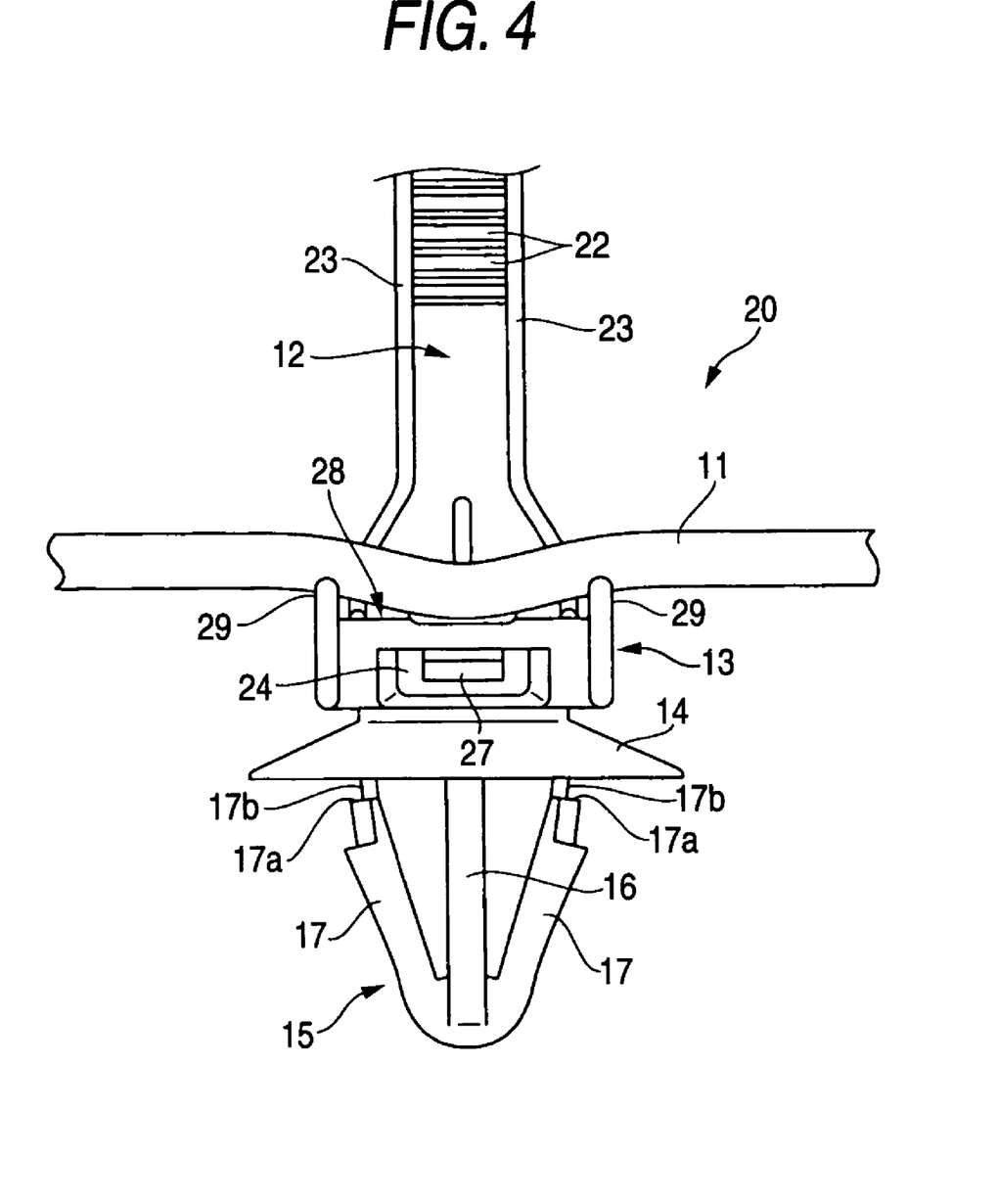
FIG. 4 is a side view illustrating the primary part of the band clamp.

Furthermore, the lock portion 13 has the flange portion 14, which obliquely downwardly flares in the direction of an outside diameter thereof, and a catching leg part 15 hanging downwardly from the center of the bottom surface thereof. The catching leg part 15 has a support column 16 and a pair of elastic catching pieces 17 upwardly extending from the bottom of this support column 16 like an anchor. As shown in FIG. 4, each of the elastic catching pieces 17 has a step part 17a, which engages with a rear-surface-side peripheral edge of the mounting hole, and an end part 17b pressure-contacted with the inner periphery of the mounting hole.

Next, an operation of this band clamp 20 is described hereinbelow.

Figure 3:
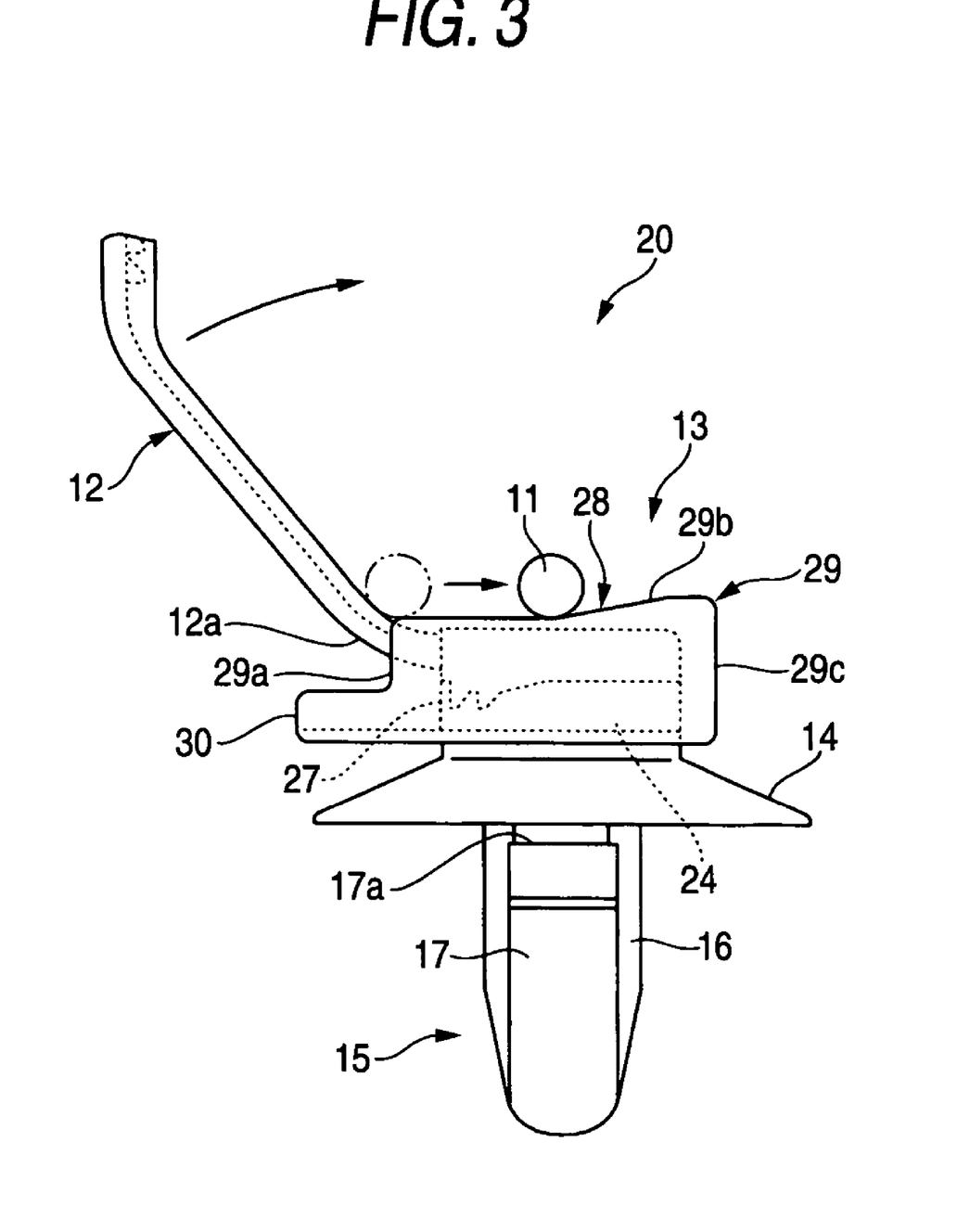
FIG. 3 is a front view illustrating a primary part of the band clamp.

In a case where the member 11 to be bundled is relatively thin electric wire, as shown in FIGS. 3 and 4, when this member 11 is put on the ribs 29 on the clamp face 28 and then the band portion 12 is wound therearound, the member 11 may be put in a corner portion between the base part 12a of the band portion 12 and the lock portion 13, as indicated by imaginary lines shown in FIG. 3. However, the rear end part 29a of each of the ribs 29 extends from a portion, to which the base part 12a of the band portion 12 is connected, in a direction in which the band portion 12 extends. When the band portion 12 is pulled up, the band portion 12 is raised from between the rear end parts 29a of the ribs 29. Thus, the member 11 to be bundled is put on the rear end parts 29a of the ribs 29 and can be moved in a direction indicated by an arrow shown in FIG. 3.

Then, the end 12b of the band portion 12 is inserted into the insertion path 24. Subsequently, the engaging projection 22 of the band portion 12 is engaged with the lock portion 13 by pulling the end 12b drawn out of the insertion path 24, thereby to prevent slip-off thereof. The member 11 to be bundled can be clamped by being fastened between the band portion 12 and the clamp face 28.

At that time, the member 11 to be bundled is moved in the direction of the arrow shown in FIG. 3 by being pushed by the band portion 12. However, when reaching the rising portions of the tapered parts 29b of the ribs 29, the movement of the member 11 is stopped. Alternatively, in a case where the member 11 ascends the tapered parts 29b, the member 11 returns to the rising portions and settles down at the position when fastened. Consequently, the member 11 is prevented from being put in a corner portion between the base part 12a of the band portion 12 and the lock portion 13. Also, the member 11 can be clamped by being placed nearly at the center of the clamp face 28.

Further, as shown in FIG. 4, the ribs 29 formed on both sides of the clamp face 28 of the lock portion 13 abut against the bottom surface of the member 11 to be bundled. Thus, the member 11 is bent toward the clamp face 28. Also, the ribs 23 formed on both sides of the band portion 12 abut against the top surface of the member 11. Thus, the clamped member 11 can effectively be prevented from being deviated in the longitudinal direction thereof.

Furthermore, as shown in FIG. 1, an elastic piece 26, to which elasticity is imparted by a pair of slits 25, is provided on the outlet-side upper wall of the insertion path 24. A lock claw 27 is formed on the inner surface of this elastic piece 26. Thus, there is no necessity for providing a space, which allows the elastic piece 26 to bend toward the rear side thereof, in the insertion path 24. Consequently, the thickness (or height) of the lock portion 13 can be reduced. Hence, when fixed to a mounting panel by the catching leg part 15, the member 11 to be bundled can be held close to the mounting panel. A wiring space can be reduced still more. Moreover, the member 11 can stably be held.

Figure 5:
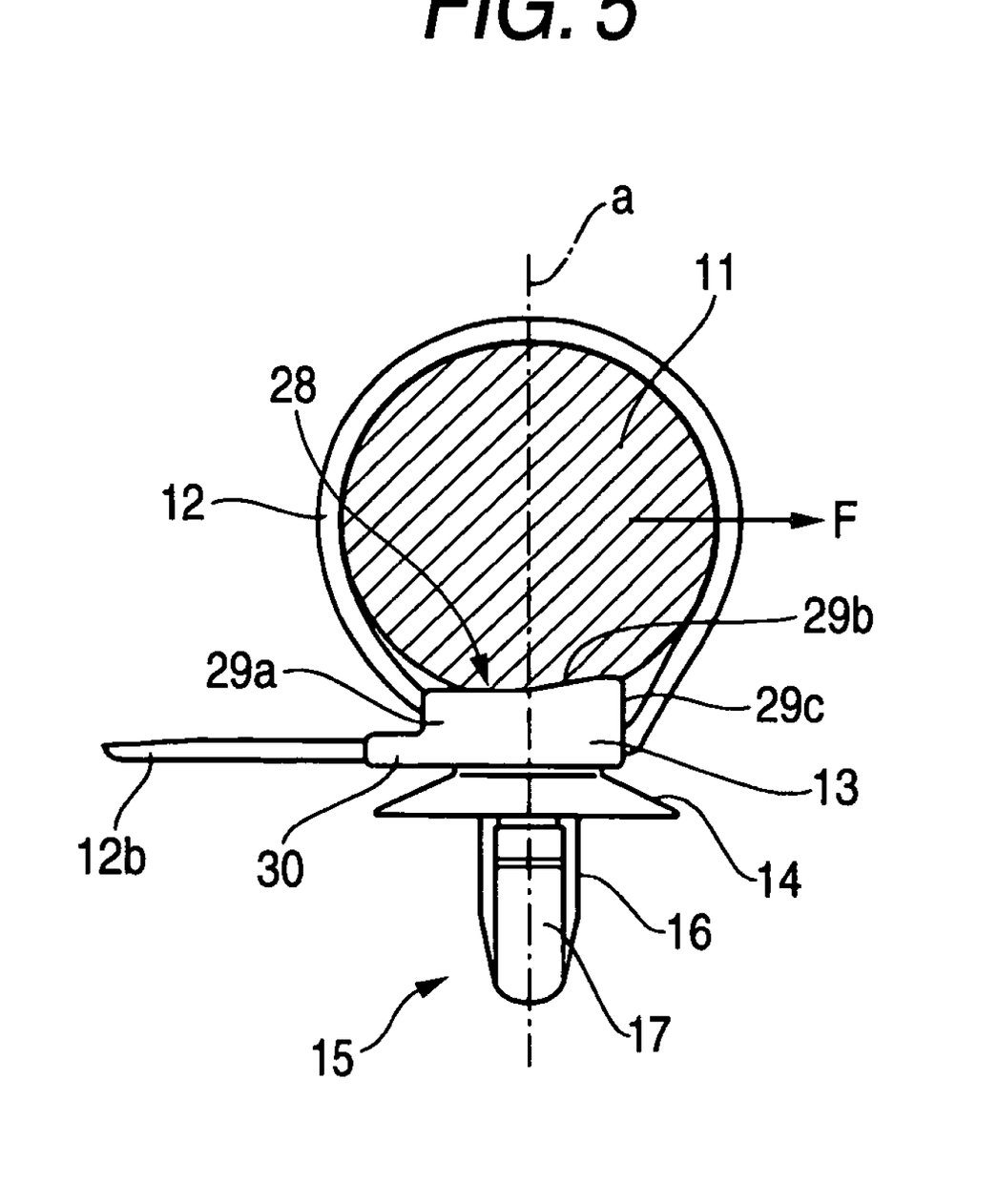
FIG. 5 is a front view illustrating a state in which a member to be bundled is clamped by the band clamp.

Further, in a case where the member 11 to be bundled is a relatively thick electric wire or a binding member of a large number of electric wires, when the band portion 12 is wound around the member 11 and then passed through the insertion path 24 and pulled, a pushing force, which acts in a direction indicated by an arrow F, acts upon the member 11. Thus, the member 11 is likely to be deviated in the direction indicated by the arrow F with respect to the center a of the clamp face 28 (that is, the shaft center of the catching leg part 15). However, according to the invention, the tapered parts 29b of the ribs 29 prevent the member 11 from moving in the direction of the arrow F. Consequently, the member 11 can be clamped by making the center of the member 11 substantially coincide with the center a of the clamp face 28.

Incidentally, at that time, the front end part 29c of each of the ribs 29 is outwardly extended from the inlet portion of the insertion path 24. Thus, the abutting portion of the member 11 to be bundled can be set to be broad. This enhances the effects of preventing the movement of the member 11, which is to be bundled, by means of the tapered parts 29b. Also, the member 11 can stably be held.

Figure 6:
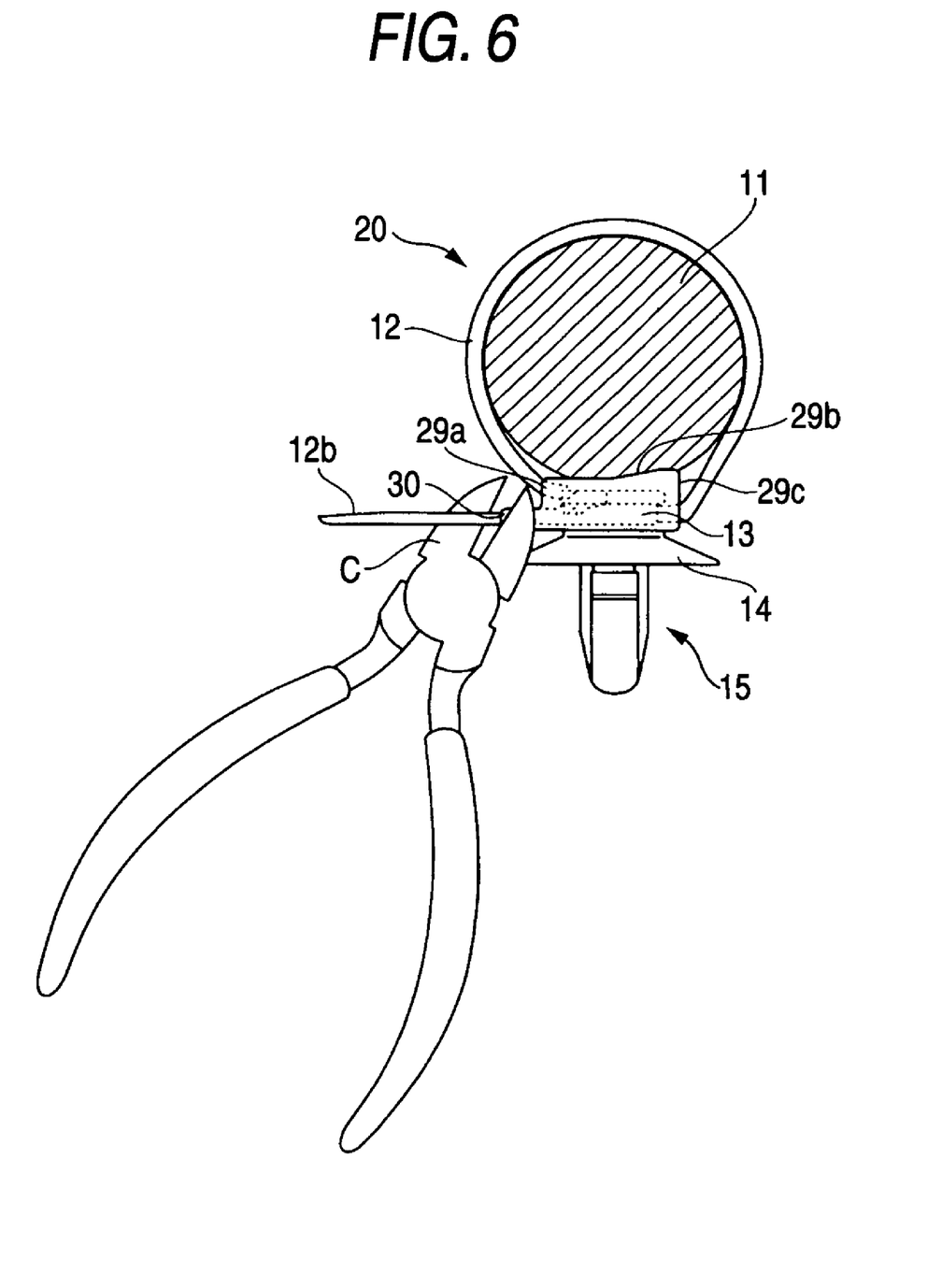
FIG. 6 is an explanatory view illustrating a state in which an excess length part of a band portion.

As shown in FIG. 6, an excess part of the band portion 12, which is drawn out of the insertion portion 24, may be cut off by a cutter C or the like after the member 11 to be bundled is clamped. At that time, because the drawing guide portion 30 outwardly extended from the flange portion 14 is provided at the outlet portion of the insertion path 24 in this band clamp 20. Thus, the band portion 12 is cut off at the end of this drawing guide portion 30 to thereby prevent the flange portion 14 from being erroneously cut off.

Figure 7:
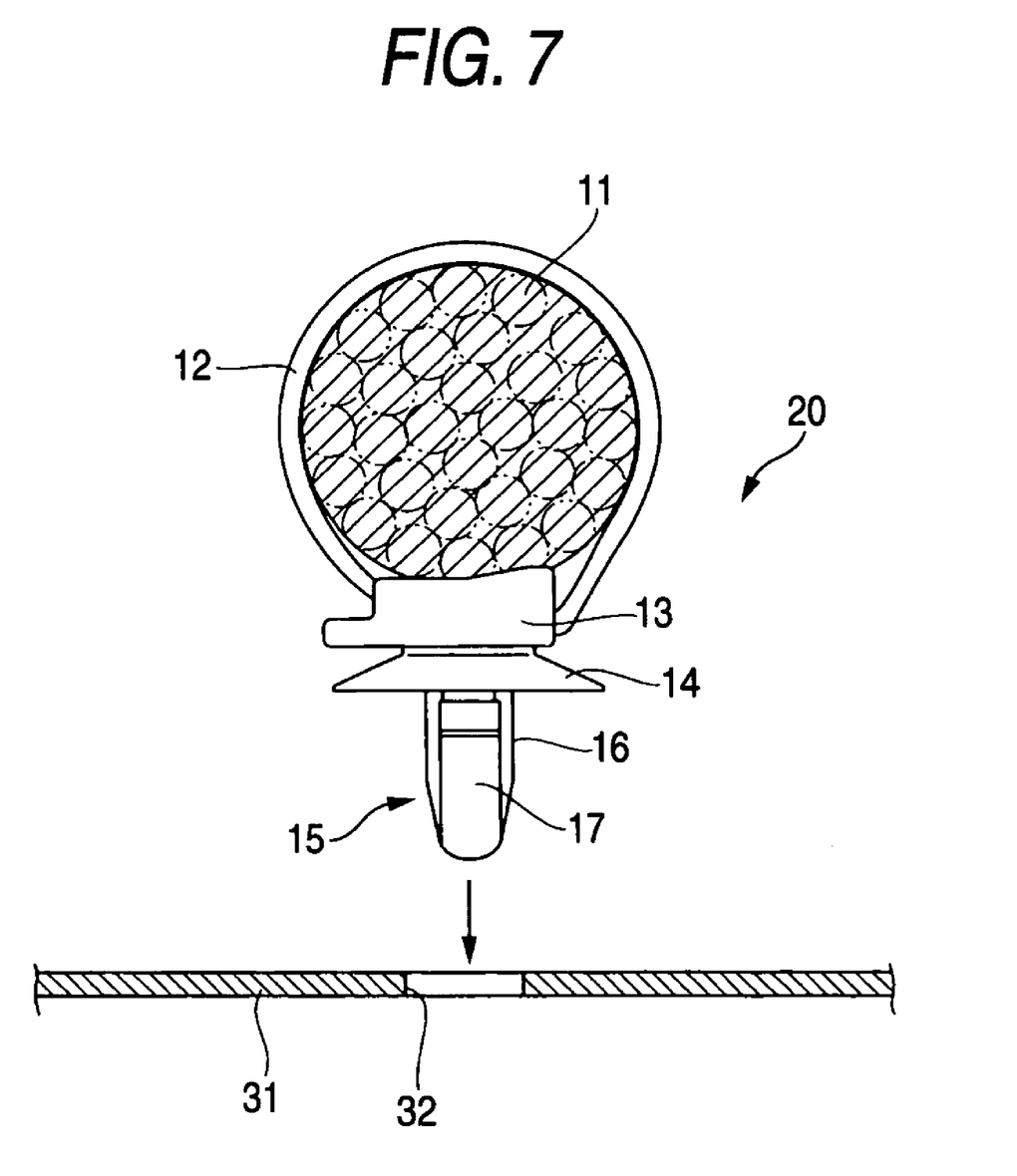
FIG. 7 is an explanatory view illustrating an operation of fixing the member to be bundled, which is clamped by the band clamp, to a mounting panel.

FIG. 7 illustrates a state in which a worker has the member 11, which is clamped in this manner, in his hand and inserts the catching leg part 15 of the band clamp 20 into the mounting hole 32 of the mounting panel 31 and fixes the member 11 to the mounting panel. At that time, the center of the member 11 to be bundled nearly coincides with the shaft center of the catching leg part 15. Thus, the worker can insert the catching leg part 15 into the mounting hole 32 by using the center of the member 11 as a target (that is, by judging that the shaft center of the catching leg part 15 is set at the center of the member 11). This facilitates a mounting operation and prevents an occurrence of a trouble that the catching leg part 15 is obliquely pushed into the mounting hole 32 and thus damaged.

The band clamp according to the invention can be utilized as a band clamp for clamping a member to be bundled, for example, a wire harness.

What is claimed is:

1. A band clamp comprising:
    a band portion which is wound around a member to be bundled;
    a lock portion to which a base end of the band portion is connected;
    engaging projections which are formed in the band portion along a direction of length of the band portion at predetermined intervals and which project toward an orthogonal direction of the direction of length of the band portion;
    an insertion path for passing through an end of the band portion;
    a lock claw that is disposed in the insertion path for engaging with the engaging projection of the band portion; and
    ribs respectively extending along both sides of the band portion from a connection part of the band portion in space in a direction in which the band portion extends, wherein:
        the lock portion has the insertion path and the lock claw; and
        the ribs are formed on a clamp face of the lock portion for abutting against which the member to be bundled.

2. The band clamp according to claim 1, further comprising:
    a catching leg part to be caught in a rear surface side of the mounting hole through a flange portion engaging with a peripheral edge of the mounting hole for mounting the member to be bundled; and
    a drawing guide portion extending in a direction in which the band portion is drawn, wherein;
        the catching leg part is formed in the lock portion;
        the drawing guide portion is provided at an outlet portion of the insertion path; and
        an end of the drawing guide portion is outwardly extended from the flange portion.

3. The band clamp according to claim 1, wherein:
    the engaging projections are formed on an inner side of the band portion; and
    the lock claw is provided on an upper wall in the insertion path.

4. The band clamp according to claim 1, wherein:
    the lock claw is provided in a part that is placed short of an outlet portion of the insertion path.

5. The band clamp according to claim 1, wherein the ribs comprise first and second ribs that extend upwardly from a top surface of the lock portion.

6. The band clamp according to claim 5, wherein the first rib and the second rib are parallel to each other.

7. The band clamp according to claim 5, wherein a height of the first rib and the second rib is lower at a center portion of each of the first rib and the second rib than at outer ends of the first rib and the second rib.

8. The band clamp according to claim 1, wherein a lowest point of the ribs is substantially centered on the clamp face.

9. The band clamp according to claim 1, wherein the ribs comprise sidewalls of the lock portion.

10. The band clamp according to claim 9, wherein the band portion is disposed between the sidewalls of the lock portion in a clamped position.

11. The band clamp according to claim 1, wherein the ribs comprise a centering portion to center the member to be bundled on the clamp face of the lock portion.

12. A band clamp comprising:
    a band portion which is wound around a member to be bundled;
    a lock portion to which a base end of the band portion is connected;
    engaging projections which are formed in the band portion along a direction of length of the band portion at predetermined intervals and which project toward an orthogonal direction of the direction of length of the band portion;

an insertion path through which an end of the band portion is passed;

a lock claw that is disposed in the insertion path and that engages with the engaging projection of the band portion; and tapered ribs that the height of each of which increases toward an inlet portion of the insertion path, wherein:
the lock portion has the insertion path and the lock claw; and the tapered ribs are formed on a clamp face of the lock portion, against which the member to be bundled abuts.

13. The band clamp according to claim 12, wherein a rising part of each of the tapered ribs is provided near a central part of the clamp face.

14. The band clamp according to claim 12, wherein the tapered ribs are formed in such a way as to project from an inlet portion of the insertion path.

15. A band clamp including:
a band portion which is wound around a member to be bundled;
a lock portion to which a base end of the band portion is connected;
engaging projections which are formed in the band portion along a direction of length of the band portion at predetermined intervals and which project toward an orthogonal direction of the direction of length of the band portion;

an insertion path through which an end of the band portion is passed;

a lock claw that is disposed in the insertion path and that engages with the engaging projection of the band portion;

ribs respectively extending along both sides of the band portion from a connection part of the band portion in a direction in which the band portion extends; and tapered ribs that the height of each of which increases toward an inlet portion of the insertion path, wherein:
the lock portion has the insertion path and the lock claw; and the ribs and the tapered ribs are formed on a clamp face of the lock portion, against which the member to be bundled abuts.

* * * * *